(12) United States Patent
Hishinuma

(10) Patent No.: US 7,080,725 B2
(45) Date of Patent: Jul. 25, 2006

(54) SORTING CONVEYOR PROVIDED WITH CROSS SORTER

(75) Inventor: Nobuya Hishinuma, Yokohama (JP)

(73) Assignee: Sanki Engineering Co., Ltd., Tokyo (JP)

( * ) Notice: Subject to any disclaimer, the term of this patent is extended or adjusted under 35 U.S.C. 154(b) by 0 days.

(21) Appl. No.: 11/054,494

(22) Filed: Feb. 9, 2005

(65) Prior Publication Data
US 2005/0167241 A1    Aug. 4, 2005

Related U.S. Application Data

(63) Continuation-in-part of application No. 10/725,842, filed on Dec. 2, 2003, now abandoned.

(30) Foreign Application Priority Data
Dec. 3, 2002  (JP)  ............................ P2002-351572
Apr. 24, 2003  (JP)  ............................ P2003-119464

(51) Int. Cl.
*B65G 47/46* (2006.01)
(52) U.S. Cl. ............................. 198/370.06; 198/370.1
(58) Field of Classification Search ........... 198/370.03, 198/370.06, 370.09, 370.1
See application file for complete search history.

(56) References Cited

U.S. PATENT DOCUMENTS

| 4,096,936 | A | * | 6/1978 | Nielsen | 198/370.06 |
| 4,763,771 | A | * | 8/1988 | Geerts | 198/370.06 |
| 4,781,281 | A | * | 11/1988 | Canziani | 198/370.06 |
| 4,884,676 | A | * | 12/1989 | Suizu | 198/370.06 |
| 5,588,520 | A | * | 12/1996 | Affaticati et al. | 198/370.06 |
| 5,690,209 | A | * | 11/1997 | Kofoed | 198/370.06 |
| 5,701,992 | A | * | 12/1997 | Enomoto | 198/370.06 |
| 5,901,830 | A | * | 5/1999 | Kalm et al. | 198/370.06 |
| 6,253,901 | B1 | * | 7/2001 | Hintz et al. | 198/370.06 |
| 6,253,910 | B1 | | 7/2001 | Axmann | |
| 6,273,268 | B1 | * | 8/2001 | Axmann | 209/654 |
| 6,360,673 | B1 | * | 3/2002 | Herrin et al. | 105/141 |
| 6,446,782 | B1 | * | 9/2002 | Patrick | 198/370.06 |

(Continued)

FOREIGN PATENT DOCUMENTS

EP    0 739 831 A2    10/1996

(Continued)

*Primary Examiner*—Douglas Hess
(74) *Attorney, Agent, or Firm*—Michael J. Striker

(57) ABSTRACT

A sorting conveyor has a cross sorter which can travel smoothly on a semicircular corner part of a traveling path. A large number of transporting units 1 are connected and travel on loop shaped transporting route in which an endless belt conveyor 2 provided at the respective transporting units 1 is driven in the direction perpendicular to the traveling direction at a sorting position. A chassis of the transporting unit consists of a beam shaped link 5 connectable to the front and rear ends thereof via connecting units 14, and a base 7 fixed to the center of the upper part of the link 5. A center guide wheel 8 is suspended from the connecting unit 14 of the end of the link 6 to come into contact with a guide rail of the transporting route. A traveling wheel 9 and a guide wheel 10 are mounted adjacent to both ends of a base 7 to come into contact with a guide rail of both sides of the transporting route. The wheels 9, 10 travel along a circular excursion whose center is a focus point of the transporting route. The connecting unit 14 is assembled in such a manner that spacers are inserted detachably at end part of the link, and the connecting units support a shaft part of the center guide wheel 8 with a spherical sliding bearing.

7 Claims, 12 Drawing Sheets

U.S. PATENT DOCUMENTS 6,796,417 B1 * 9/2004 Soldavini et al. ...... 198/370.06
6,889,814 B1 * 5/2005 Cerutti et al. ................ 198/358
6,938,750 B1 * 9/2005 Miller et al. ........... 198/370.06

FOREIGN PATENT DOCUMENTS

WO           00/32501           6/2000

* cited by examiner

SORTING CONVEYOR PROVIDED WITH CROSS SORTER

The present application is a Continuation-in-Part of application Ser. No. 10/725,842, filed Dec. 2, 2003 now abandoned.

BACKGROUND OF THE INVENTION

Field of the Invention

The present invention relates to a sorting conveyor comprised of a plurality of transporting units traveling on a transporting route shaped in a loop, and more particularly, to a sorting conveyor provided with a cross sorter which includes a belt capable of being driven in the direction perpendicular 10 to the direction in which the transporting units are conveyed.

Various types of cross belt sorters in which a large number of transporting units carried on a route shaped in a loop are connected include an endless belt that is capable of being driven in the direction perpendicular to the traveling direction of the respective transporting units. Most transporting units are supported with four wheels, the units travel by the pulling of the link or the chain, and the endless belt for sorting the transporting units are by a motor using a current collector. However, in recent times, battery-driven operations are performed by accumulating electricity during transportation by using a free roller (for instance, Japanese Patent Application Laid-Open Publication No. HI-139418, page 2, right lower column, lines 4 to 18, FIG. 3). In addition, it is also known that those which comprise a power supply apparatus which include a power generator and an accumulator for driving an endless belt for sorting (for instance, Japanese Patent Application Laid-Open Publication No. H10-35873 (Page 3, right column, lines 31 to 38, FIG. 1).

These conventional techniques have a complicated structure, the noise during the operation is severe, and there is a risk of spark generation when using, for instance, when using a current collector. According to the above described patent document 1, as transporting units are supported by four traveling wheels; therefore, there are many working faces in which rails and frames comprised of sheet metal, which causes such problems that accuracy is difficult to be obtained; consequently, noise is easily generated. In addition, there occurs the matter that a timing belt between a wheel and a generator can be damaged by torque when power is generated. Further, when one timing belt is damaged, other timing belts are damaged continuously, thus there is the possibility that the system shuts down.

In conventional cross belt sorters, the physical relationship of a traveling wheel and a link is inappropriate. For that reason, tracing at the curved part becomes inconsistent, which eventually causes a disturbance that is a reason for the cause of vibration and noise. Since one guide wheel travels along the rail in which angles are made opposite, it becomes necessary to provide gaps between the angles; thereby, vibrations are generated at the time when the guide wheel enters into curved rail part. In addition, the traveling guide rail has a channel shape therefore the traveling wheel comes into contact with a rail's upper flange when it reaches the entrance of the slope 5 part, so that the traveling wheel counter-rotates suddenly resulting in one cause of vibration.

Further, in a transporting unit disclosed in the above-described patent document, a chassis member is formed T-shape by combining a member of the longitudinal direction at the center of a transverse member, and there are provided two wheels at both ends of the transverse member to travel. Because of this structure, the center position of the transporting unit shifts from the focus point of the traveling wheels at the time of traveling the curved part, which tends to cause noise easily. That is, as shown in FIG. 16, there are provided traveling wheels 64, 64 at the both ends of a front part transverse member 63 of chassis 62 in transporting unit 61 to travel. Therefore, the position of the traveling wheels of the transporting unit 61 is shifted from the focus point 60 at the semicircular corner part of the traveling path, which prevents smooth traveling. Because the traveling wheels 64, 64 are arranged at the position with deviation from the focus point, in the case when a fixed wheel is utilized as the force in the thrust direction is applied for a long period, and so the wheels are prone to be damaged easily. When a rotatable caster type wheel is utilized, a bearing will stop moving because of the dust or the like. Furthermore, no consideration is given to an adjustment with regard to the elongation of the chassis.

SUMMARY OF THE INVENTION

An object of the present invention is to provide a cross belt conveyor which is capable of traveling smoothly in the semicircular corner part of the transporting route. Furthermore, it aims to provide a sorting conveyor comprising a cross sorter which can travel stably without being affected by its installation level in such a manner that the guide wheel and the traveling wheel function as the coaster type guide wheel (i.e. pinching method) so as to make it possible to travel securely, as well as the main part of the cart is formed in a square cylindrical beam in order to have a torsion corresponding link. The present invention comprises a sorting conveyor in which a plurality of transporting units are connected to travel on a transporting route shaped in a loop and a conveyor for cross sorting is provided on each transporting unit which is driven at a sorting position, characterized in that the transporting unit consists of a chassis formed with a beam shaped link and a base fixed to the center of the upper part of the link in the perpendicular direction, said transporting unit is connected at the front end and the rear end of the beam shaped link, respectively, said conveyor for cross sorting is supported at the upper part of the base in such a manner that the cross sorting conveyor can be driven reversely in the direction perpendicular to the traveling direction of the transporting unit, and a pair of traveling wheels which are mounted on both ends of the base come into contact with guide rails arranged on both sides of the transporting route, so that while traveling on the curved part of the transporting route, said traveling wheels travel along a circular locus whose center is a focus point of the curved transporting route.

The conveyor for cross sorting is an endless belt conveyor or a driving roller conveyor. A connecting unit for linking the transporting unit is attached to the front and rear ends of the beam shaped link, and the guide wheel is suspended from respective connecting units provided at the ends of the link so as to travel in such a manner in which to contact the center rail of the center of the transporting route.

Further, there are provided level guide rails and oblique side rails at both sides of the transporting route, wherein the traveling wheels that are installed adjacently to both sides of the base come into contact with the level guide rails while coaster type guide wheels which are associated with the traveling wheels so as to pinch the guide rail member come into contact with the oblique side rails.

Moreover, the connecting unit with the same width as said link is assembled while inserting a spacer at an end part of the link detachably, and the connecting unit supports a shaft part of the guide wheel guided by the center rail with a spherical sliding bearing. According to the above-described structure of the present invention, the endless belt transporting unit is supported by two traveling wheels in which the wheels are positioned at the focus point of the center of semicircular in the curved part, and the link position is determined appropriately. As a result, it can travel without making noise which has been conventionally generated by the deviation of the center. Further, friction driving is employed as a driven system, that is, a generating system in which a generator is rotated directly from the traveling rails through the free roller. A counter-measure is provided against the link chain elongation by inserting a spacer at a joint part of the connecting link so that when the length of the connecting link is elongated, such an elongated connecting link can be fixed easily to the prescribed length by removing any arbitrary spacer of link ends. Moreover, by providing a gap plate for supporting two wheels, it is possible to prevent pitching at the time when the transporting unit travels.

BRIEF DESCRIPTION OF THE DRAWINGS

FIG. 11 shows another embodiment of the present invention;

DETAILED DESCRIPTION OF THE PREFERRED EMBODIMENTS

Figure 1:
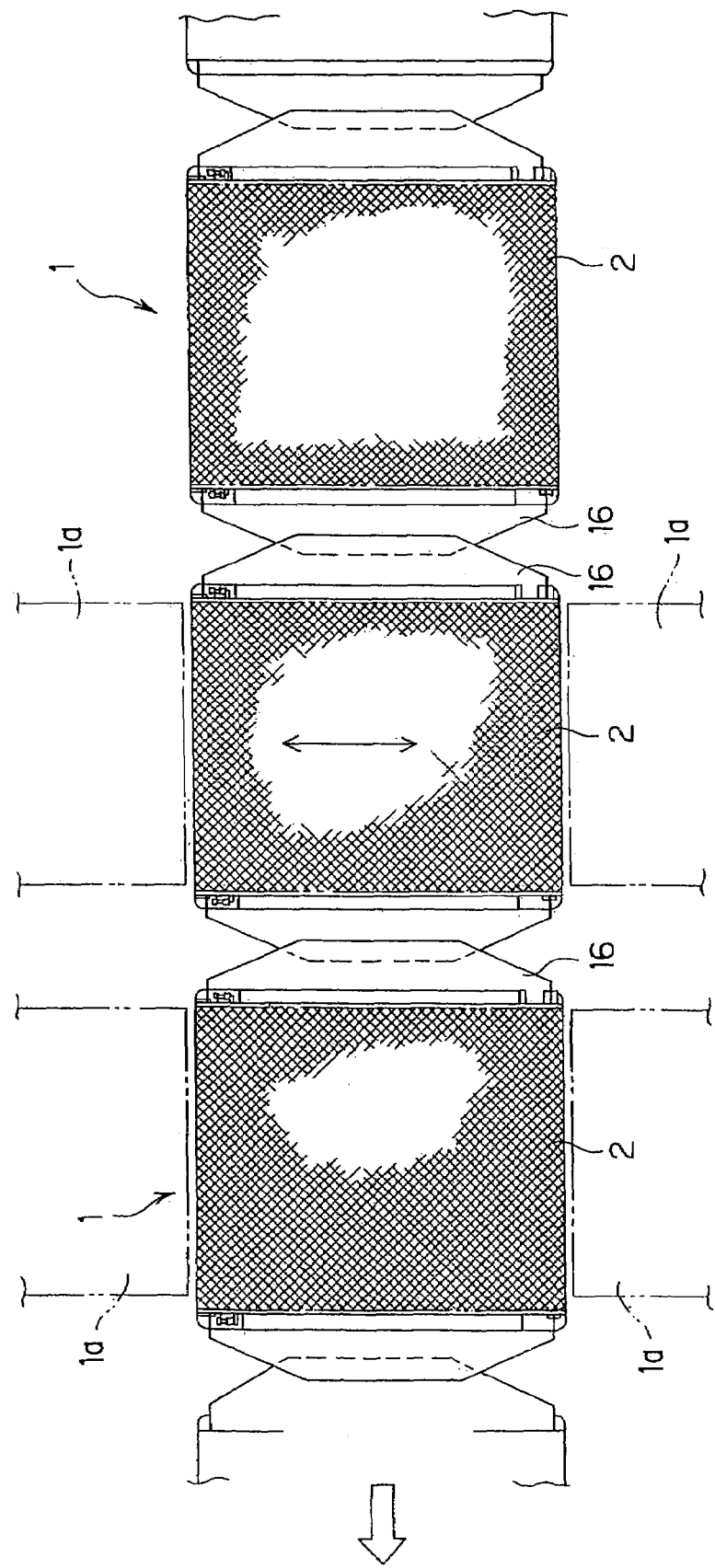
FIG. 1 is a plane view of a sorting conveyor comprising a cross sorter of the present invention.
Figure 2:
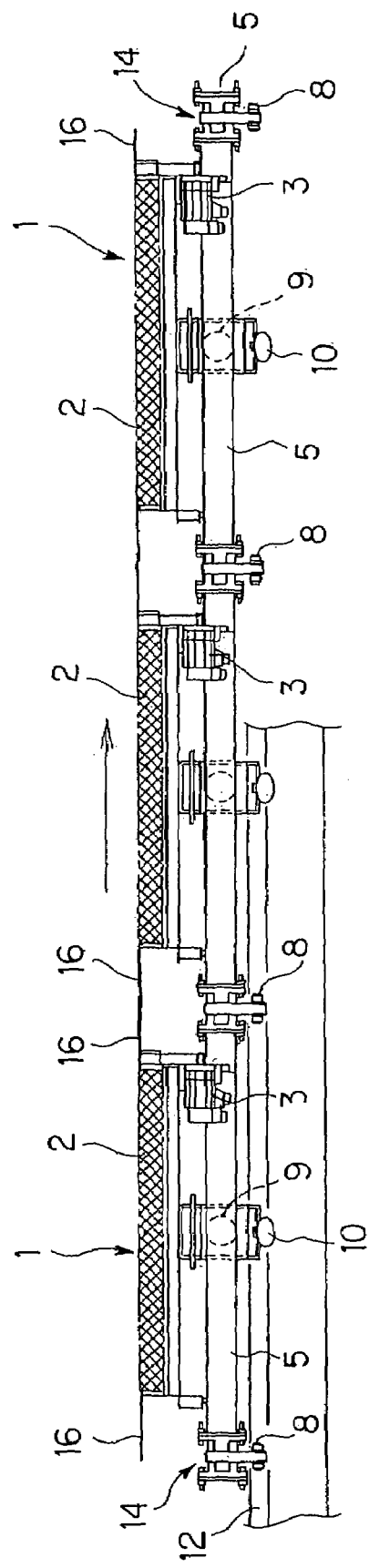
FIG. 2 is a front view of FIG. 1.

FIG. 1 is a plane view of a sorting conveyor comprising a cross sorter of the present invention. FIG. 2 is a front view of FIG. 1. In this invention a large number of transporting units 1, 1 on which baggage is loaded are connected and delivered along the transporting route shaped in a loop, and then the baggage is discharged to a sorting chute or conveyors 1a, 1a while the conveyor for the cross sorter comprising transporting units 1 is driven at the sorting position. The example of FIG. 1 shows a cross be lt sorter, in which an endless belt conveyor 2 is provided as the conveyor for cross sorting. As described later with regard to FIG. 15, the transporting unit 1 travels along a circular excursion of the transporting route, whose center is the focus point 60 at the time when it travels at the curved part.

Figure 3:
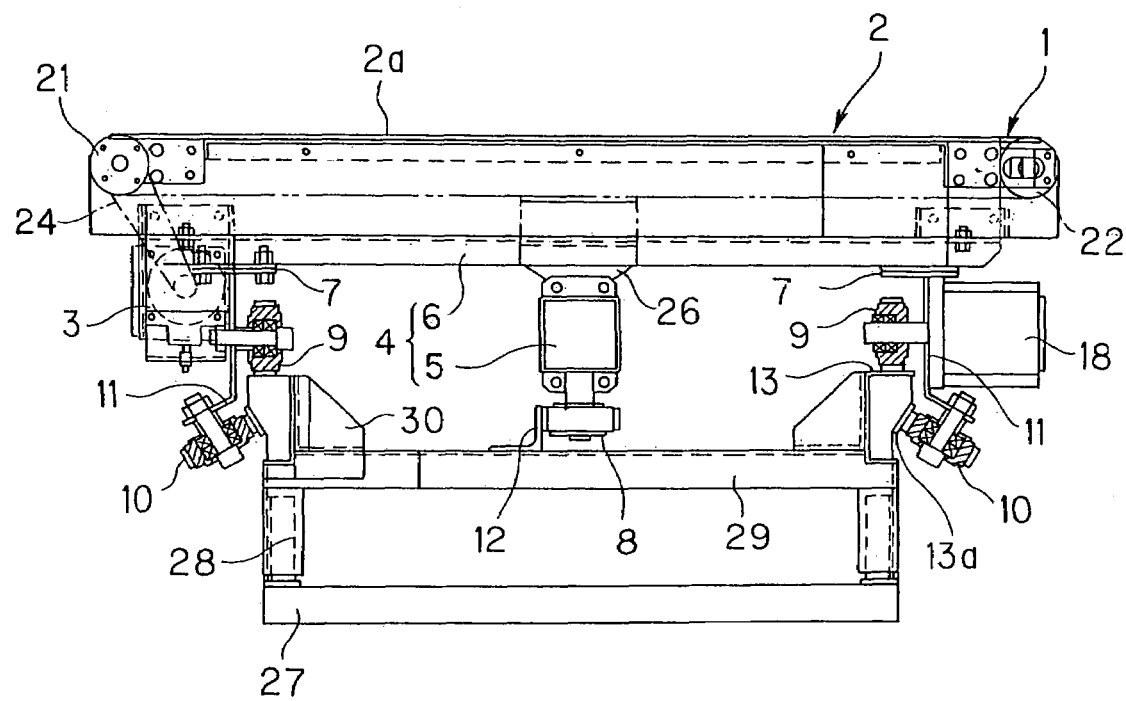
FIG. 3 is an enlarged right side view of FIG. 1.
Figure 4:
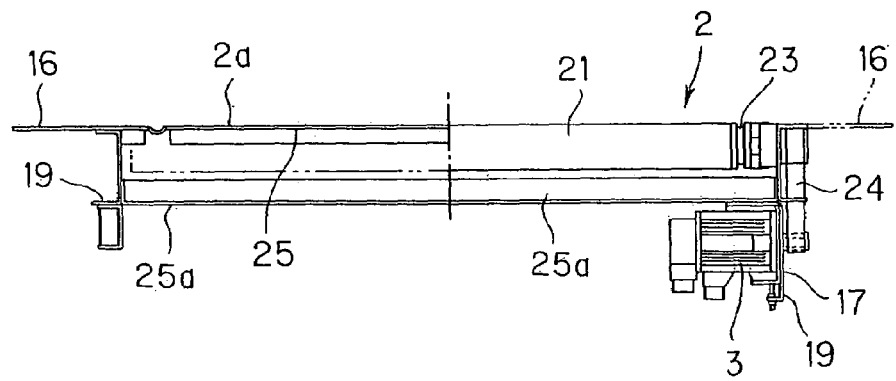
FIG. 4 is a lateral cross sectional view of FIG. 3.
Figure 6:
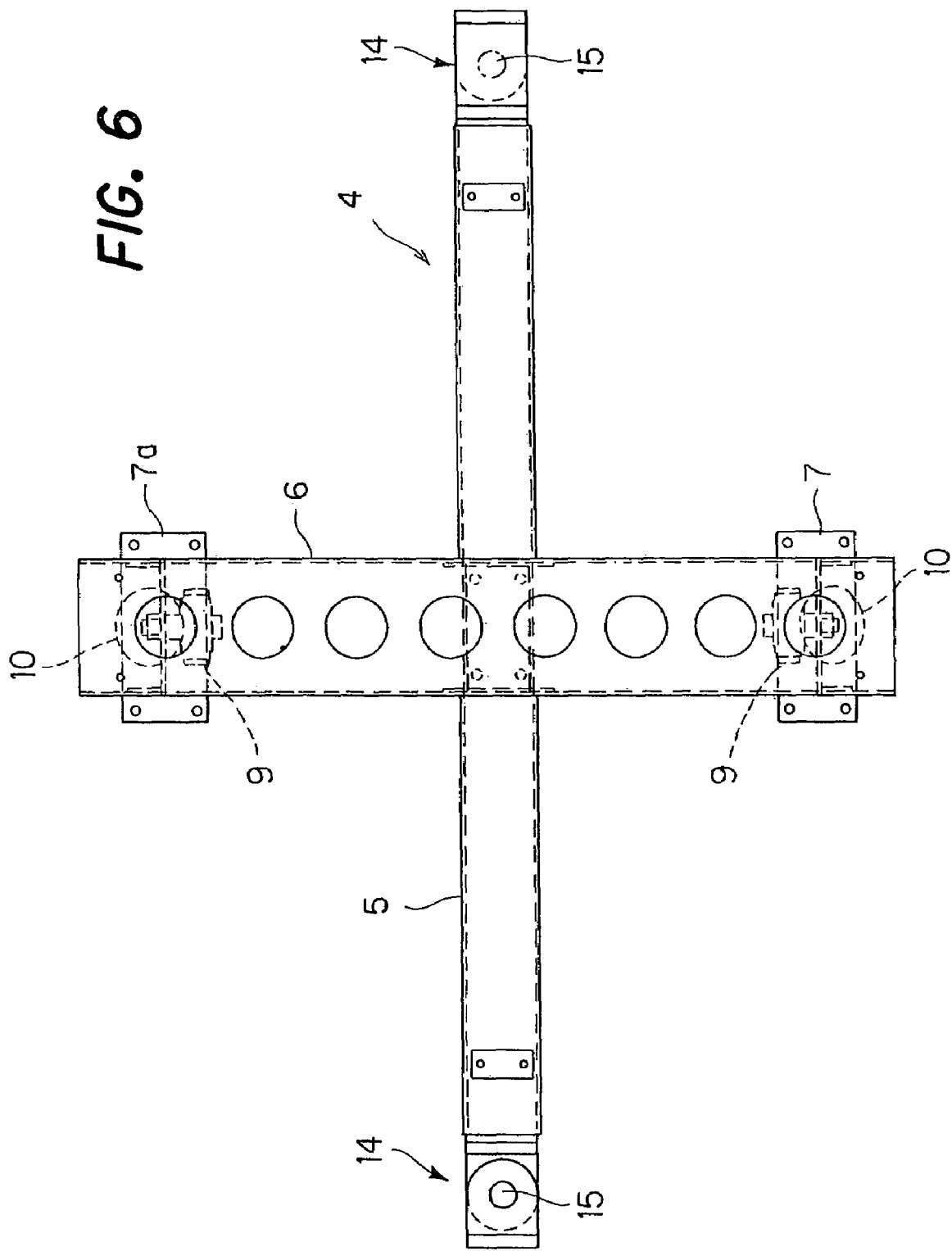
FIG. 6 is a plane view of a cart of a transporting unit.
Figure 7:
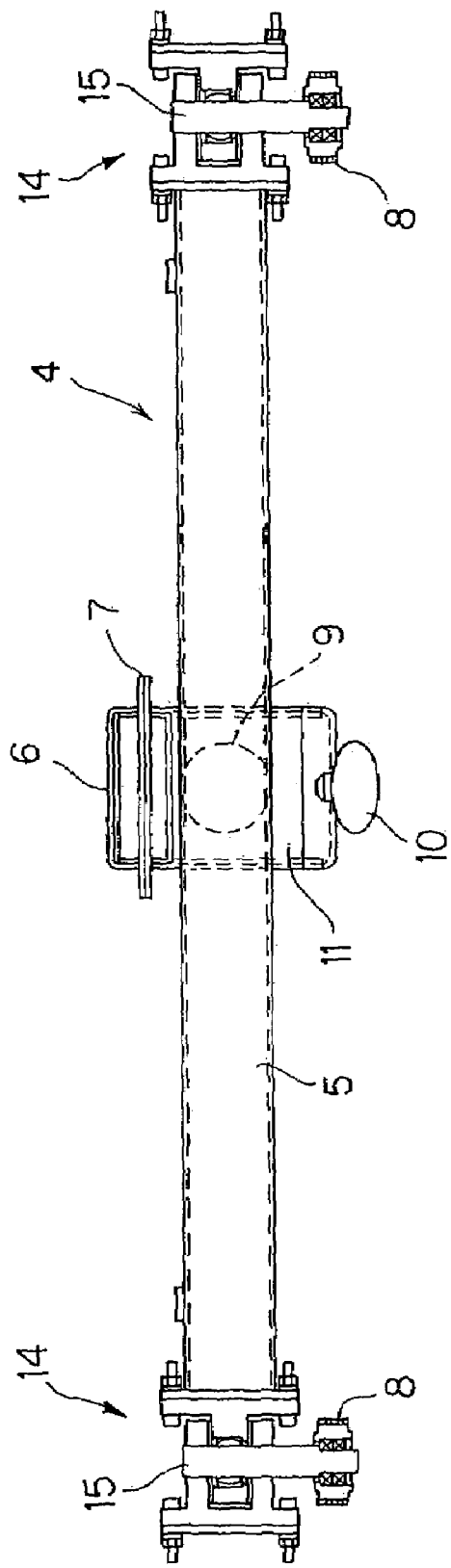
FIG. 7 is a front view of FIG. 6.

As shown in an enlarged side surface in FIG. 3, in the transporting unit 1, the endless belt conveyor 2 is mounted on a cart 4 which travels along guide rails of the transporting route. The chassis of each cart 4 is comprised of a link 5 connected to the front end and the rear end of the chassis via a connecting unit 14, and a base (or a cross member) 6 fixed to the center of the upper part of the link 5 in the direction perpendicular to the link (FIGS. 6, 7). A frame 19 of the belt conveyor 2 is mounted on the upper portion of a base 6. The link 5 is constituted by using a square cylindrical shaped beam so as to withstand the torsion which is generated by the offset load when baggage is loaded onto the transporting unit 1. There is provided a connecting unit 14 at the end of the link 5. A level guide wheel 8 is suspended from a connecting pin 15 that is penetrated through this unit 14 while installation plates 7, 7 are fixed securely adjacent to both ends of the base 6. Brackets 11 are provided with both plates 7 so that traveling wheels 9, 9 and oblique guide wheels 10, 10 are mounted on the plates by using the brackets 11. Further, a generator 18 is mounted onto one bracket 11 (right bracket in FIG. 3) in such a manner that the generator is mounted to have the same axis as that of the traveling wheel 9 of the bracket 11. However, the illustration of the generator 18 is omitted in FIGS. 4, 5. In those drawings, reference numeral 25a denotes a lower board installed within a conveyor frame 19. In FIG. 3, numeral 26 denotes a bracket for fixing links provided at the center of the lower surface of the base 6, and reference numeral 30 denotes a rail bracket provided on both sides of a horizontal member. Reference numeral 27 connotes a stand for supporting rails, while numeral 28 is a leg and numeral 29 is the horizontal member. In FIG. 4, numeral 25 is a slide bed provided on the upper surface of the belt conveyor frame 19 for supporting the lower surface of the traveling side of the endless belt conveyor 2.

The level guide wheel 8 comes into contact with a guide rail (center rail) 12 located at the center of the traveling route. The traveling wheels 9, 9 come into contact with level guide rails 13, 13 at both sides of the traveling route. In the meantime, the oblique guide wheels 10, 10 come into contact with side rails 13a, 13a of the outer side part of the guide rails 13, 13, which are declined downwardly. With this structure, a coaster type guide wheel is formed in such a manner as to put the guide rail between the traveling wheels 9 and the oblique guide wheels 10 (FIG. 3).

Figure 5:
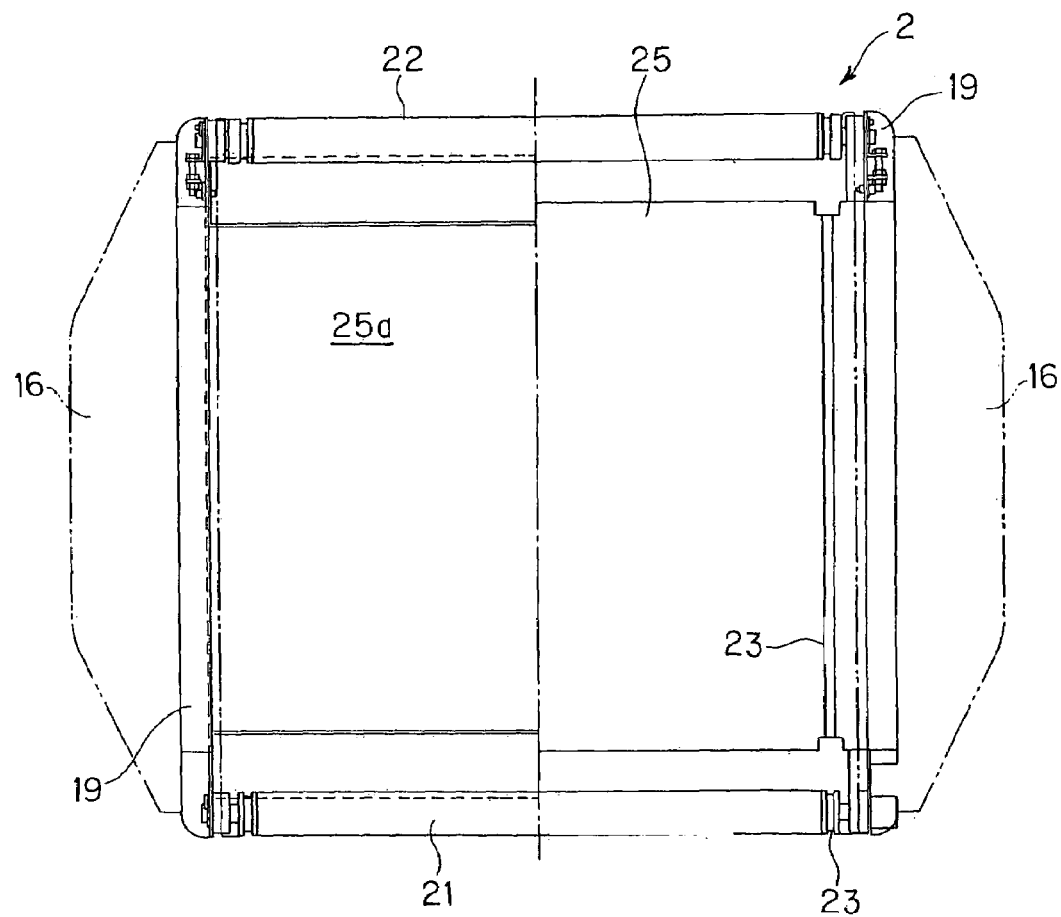
FIG. 5 is a plane view of an endless belt conveyor (cross belt)

FIG. 4 is a front view of the endless belt conveyor, and FIG. 5 is a plane view of FIG. 4.

The endless belt conveyor 2 is located between a driving pulley 21 provided at the conveyor frame 19 and a driven pulley 22 so as to be driven by a drive motor 3. There is provided a bracket 17 at one lower part of a conveyor frame 19, and the belt drive motor 3 is mounted thereon. An electric power supply circuit is secured for the belt drive motor 3 in such a manner that the generator 18 is fixed to the other bracket 11 which is located at the other end of the base, 6 is activated to accumulate electricity according to the rotation of the traveling wheel as described previously. When the transporting unit 1 is advanced to a prescribed sorting position, the belt drive motor 3 is activated so as to discharge the baggage (illustration is omitted) to a sorting chute while driving the endless belt 2. The conveyor frame 19 is placed on the link 5 and is fastened securely with a bolt 33 (FIG. 8).

There are provided gap plates 16, 16 (FIGS. 1, 2, 4 to 7) part of which overlaps each other at the front end and the rear end of the conveyor frame 19 that is located at the upper part of the connecting unit 14 (FIGS. 6, 7). Such a structure makes it possible to suppress the pitching that is easy to occur at the time when the transporting unit 1 of both right and left traveling wheels (two-wheel supporting) travels, and thereby, the vibration or disturbance of the baggage placed on the conveyor can be prevented. Pulleys 21, 22 have a V-groove 23, and there are provided projections (illustration is omitted) adjacent to both right and left ends of the rear surface of a belt 2*a* to engage the V-groove into the projection so that the meandering of the belt is prevented. Furthermore, a slide head 25 also includes the same V-groove 23 as described above.

The belt driving system is of the friction driving. The generator 18 employs a technique in which the generator 18 is rotated by directly connecting to the traveling guide rail 13 via the traveling wheel 9, that is, a free roller. When a generator is driven via a timing belt in a conventional manner, at times, there is a risk to damage a timing belt between a wheel and a generator due to the torque at the time when the electric power is generated. When one timing belt is damaged, other timing belts are also damaged subsequently, so that there is possibility to shut down the whole system. On the contrary, the present invention adopts a direct connecting type electric generator system. Thereby, it provides a stable electric power source in for the motor (servo motor) 3 without using such a timing belt.

Figure 8:
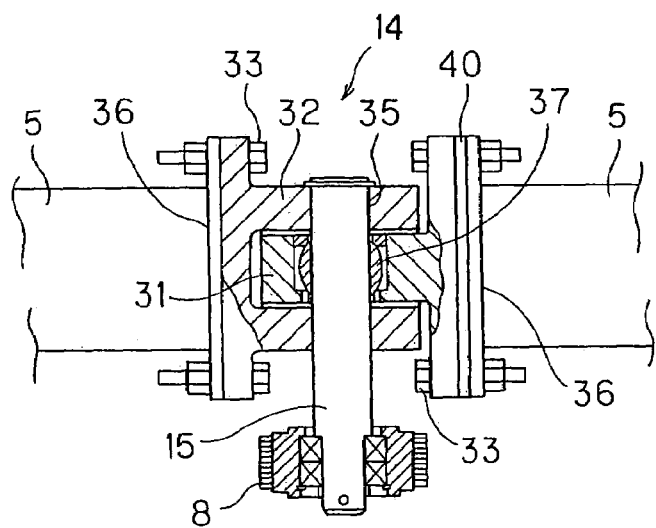
FIG. 8 is an enlarged sectional view of a connecting part.
Figure 9:
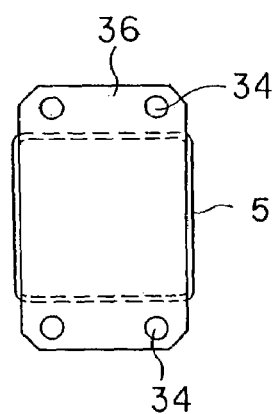
FIG. 9 is an end view of a beam shaped link.
Figure 10:
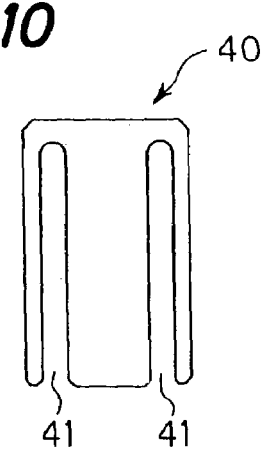
FIG. 10 is a front view of a spacer disposed at the connecting part of FIG. 9.

FIG. 8 is an enlarged sectional view of the connecting unit 14 of the link 5. FIG. 9 is an end view of a beam shaped link 5. In FIGS. 8 and 9, numeral 15 is a connecting pin, and numeral 31 is a connecting protrusion of the connecting unit 14. A connection receiving part 32 and a bolt 33 for tightening a flange are provided. A bolt hole 34 is provided at the flange 37, while numeral 35 denotes a connecting pin hole and numeral 36 is a flange of the beam end. A spherical sliding bearing 37 engages with the inside of the connecting protrusion 31. A plate 38 is provided for fixing the traveling wheels. FIG. 10 is a front view of a spacer. Flat spacers 40, 40 are detachably inserted between a flange 36 provided at the end part of a link 5 and a flange provided on the connecting protrusion 31 and/or the connection receiving part 32 side to be assembled into the connecting unit 14, while the connecting unit 14 supports a shaft part of the level guide wheel 8 with a spherical sliding bearing 37 so that the link 5 bends freely in the right and left directions or upward and downward direction so as to correspond to any curvature. This connecting unit 14 achieves continuous contacts to the friction drive (FIGS. 11, 12) in such a manner that the connecting unit 14 has the same width as the link 5 so that any gaps between the links can be eliminated. In a conventional manner, when such a transporting unit is connected by a general type link, a gap is generated between the links. As a result, traveling noise is produced at a friction drive part. On the contrary, in the present invention, the connecting part between the links is made to have the same width as the link so that the cause of the noise can be dissolved.

In FIG. 10, numeral 41 denotes slits provided adjacent to both sides of the spacer 40 so as to avoid interfering with bolts 33, 33 penetrating between the flanges when the connecting unit 14 is assembled.

As described above, it is possible to restore the link chain easily in such a manner that the spacer 40 is inserted into the connecting part of the link 5 in advance. That is, when the link chain is elongated, the spacer 40 at the described position is removed. In the conventional type conveyor, the link structure cannot cope with the torsion caused by off setting the load on the conveyor. As a result, vibration and squeak noise are generated depending on the accuracy of the traveling 11 rail, and in some cases, the link is damaged. On the other hand, in the present invention, the link 5 has employed a square cylindrical shape beam to correspond the torsion so that stable traveling can be performed without being affected by its installation level. In addition to this, as will describe later with respect to FIG. 15, according to the present invention, the cross belt sorter travels with two traveling wheels 9, 9 along the transporting route. With this structure, it travels smoothly without making noise when it moves, especially, along the circular arc in the curved part whose center is the focus point 60. As explained with reference to FIGS. 8 to 10, excess spacers 40 for taking up are mounted on a joint part (connecting unit 14) of the link 5. Thereby, it is possible to absorb the elongation of the link 5 in such a manner that the spacer is removed one by one to fasten the link 5 again when the link 5 is elongated. Spacers 40 are inserted between the end face of the connecting link and the connecting unit 14 for the countermeasure for the link chain elongation (for instance, when beam pitch is of 1500 mm, spacer width is of 6 mm). With this structure, when the length of connecting link is elongated, any arbitrary spacer 40 located at the end of the link can be removed so as to restore the link length to the prescribed link length.

Figure 11:
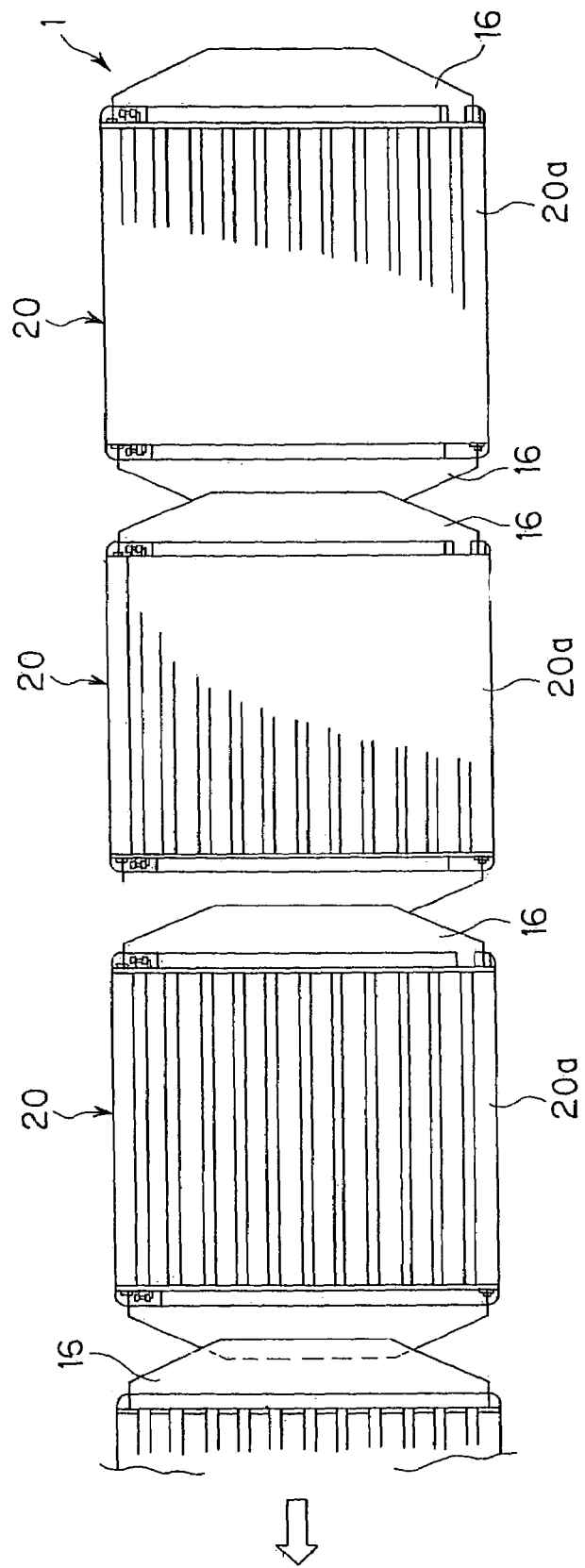
FIG. 11 is a plane view of a sorting conveyer comprising a roller conveyor provided on the traveling trucks which are connected for cross direction.
Figure 12:
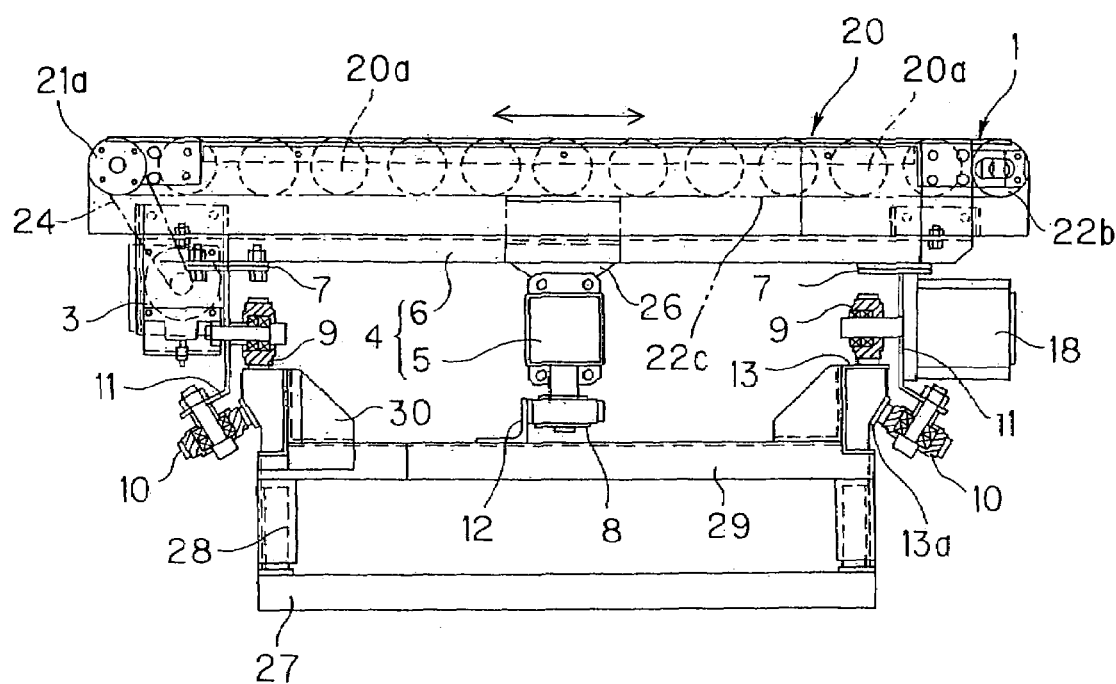
FIG. 12 is an enlarged side view of the traveling truck in FIG. 11.

FIG. 11 is a plane view of a sorting conveyor comprising a roller conveyor instead of a cross belt on a transporting unit (a traveling truck) according to a second embodiment of the invention. FIG. 12 is an enlarged side view of the traveling truck shown in FIG. 11. A roller conveyor 20 mounted on the conveyor frame 19 has the same structure as the one shown in FIG. 3. That is, a transmission chain 3*b* is engaged between a sprocket 3*a* fixed to an output shaft of the motor 3 which is driven by the power supplied from the generator 18 and a drive sprocket 21*a*. A chain 22*c* is engaged between the drive sprocket 21*a* and the driven sprocket 22*b* in such a manner that the chain 22*c* is engaged with a sprocket (not shown) provided at the shaft ends of respective rollers 20*a* of the conveyor 20. The respective rollers 20*a* are then rotated by the forward and/or reverse rotation of the motor 3.

In this case, similarly, a large number of transporting units 1,1 loading the baggage are connected and delivered along the transporting route shaped in the loop in such a manner to drive a roller conveyor 20 mounted on each transporting units 1 in the perpendicular direction of the traveling direction at the sorting position to discharge the baggage.

Figure 13:
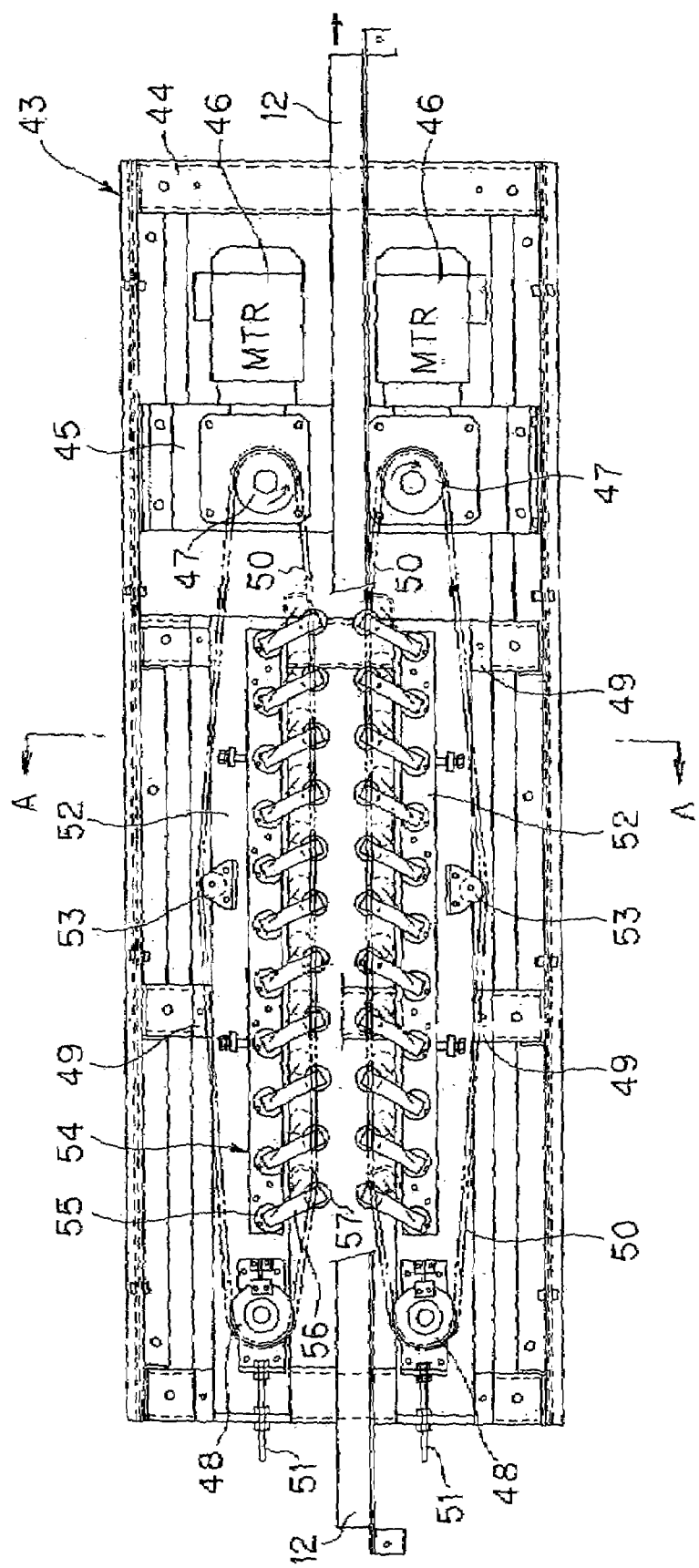
FIG. 13 is a plane view of a drive unit.
Figure 14:
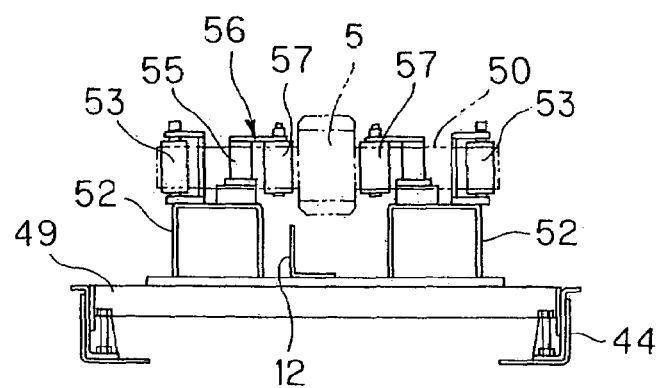
FIG. 14 is a sectional view along the A—A line of FIG. 13.

FIG. 13 is a plane view of a drive unit. FIG. 14 is a cross-sectional view cut along A—A line of FIG. 13. The drive unit 43 is provided to move the transporting unit 1. The drive unit 43 comprises a transverse member 45 for supporting the motor and transverse members 49, 49 for supporting a friction belt on the stand 44 so as to fix a center rail 12 for guiding the guide wheel 8 to the center in the longitudinal direction of respective supporting members. A pair of motors having reduction gear 46, 46 is arranged on the transverse member 45 in such a manner to pinch the center rail 12 therebetween. A roller supporting member 52 that is put over the transverse members 49, 49 includes friction belts 50, 50 which are pressed down to both side surfaces of the beam shaped link 5 of the cart. Each friction belt 50 includes a large number of friction rollers 57, 57 for pressing down the forward side of the friction belt 50 to the tip of the arm 56 is fixed onto the shaft of a torsion spring containing a support cylinder 55 in the direction in which the beamside surface is pressure welded. Further, a guide roller 53 for preventing the bound or shake of the friction belt 50 is provided at the return side of the friction belt 50. Further, take-ups 51, 51 for changing the tension to the friction belts 50, 50 are provided at the side of driven pulleys 48, 48.

As described previously, the friction belt is driven while pressing the link side surface so as to eliminate the gap between the friction belts 50, 50 and the link 5 in considering the friction drive. With this structure, when the elongation is occurred in the friction belt 50, it can be adjusted easily by operating the take up 51.

Figure 15:
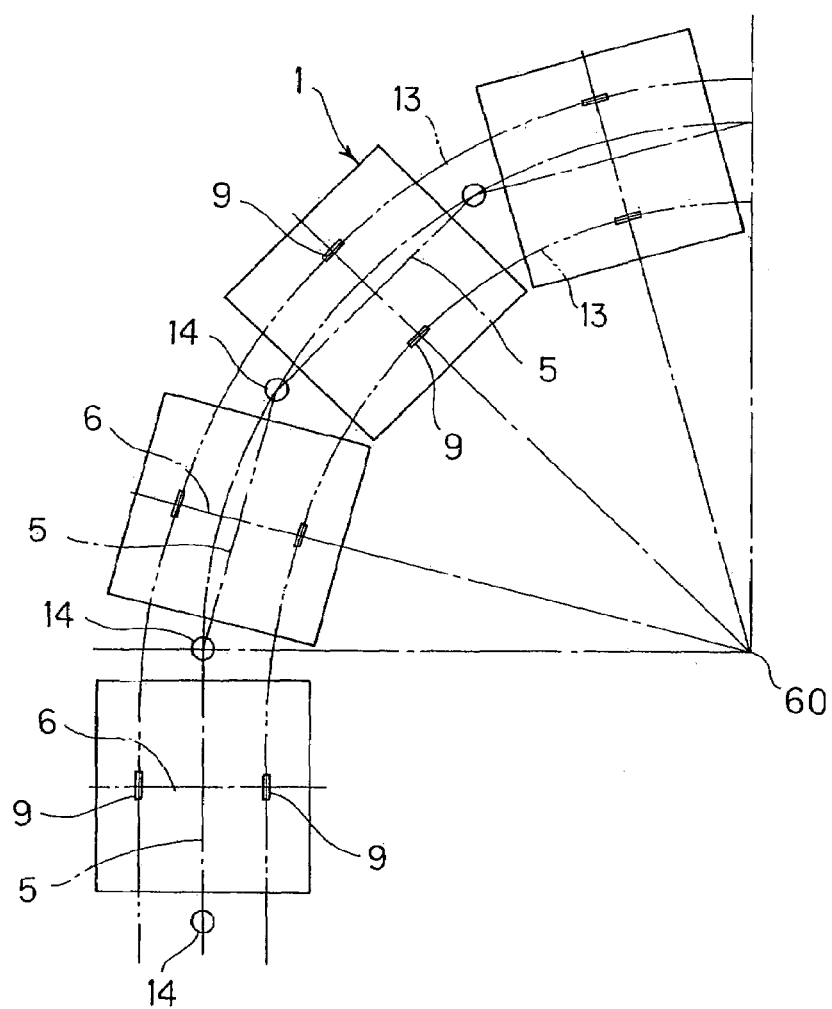
FIG. 15 is a plane view showing a focus point on a curved traveling path of the sorting conveyor of the present invention.

FIG. 15 is a plane view showing the focus point on a curved traveling path of the sorting conveyor comprising the cross sorter according to the present invention. The guide wheel 8 is arranged to come into contact with the guide rail (center rail) 12 located on the center of the transporting route while being suspended from the connecting unit 14 located at the end of the above described beam shaped link. There are provided the coaster type traveling wheel 9, and the guide wheel 10 adjacent to both ends of the base 6 so as to come into contact with the guide rails 13, 13a located on both sides of the transporting route. When traveling on the curved part, the traveling wheels travel along a circular excursion whose center is the focus point 60 of the transporting route.

Figure 16:
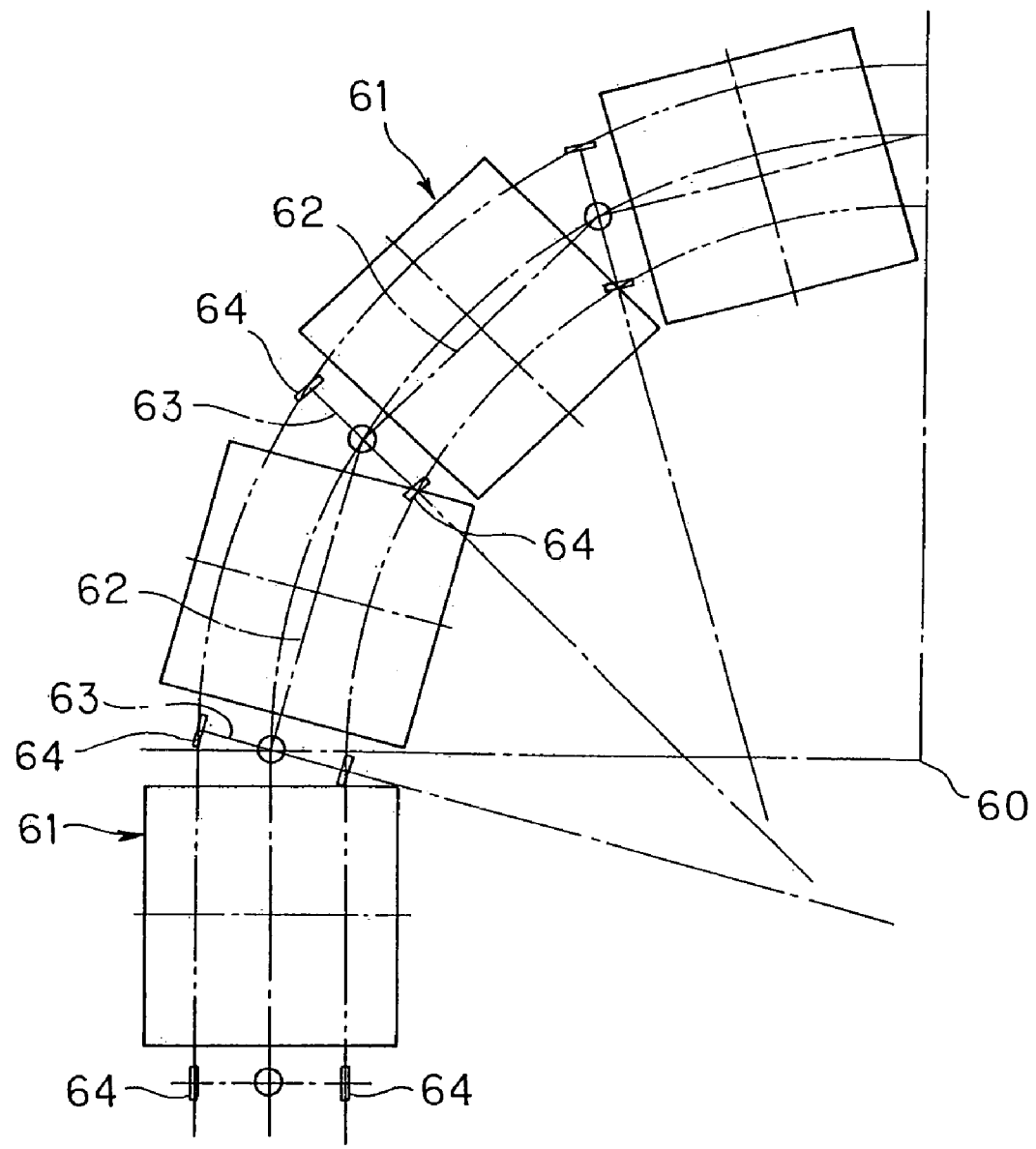
FIG. 16 is a plane view showing deviation of the focus point on a curved traveling path of the conventional cross belt sorter.

As apparent from the above explanation referring to the drawings, in the present invention, the right and left two traveling wheels support the transporting unit in such a manner that the traveling wheels are positioned at the focus point of the semicircular center in the curved part and the link position is made appropriately, so that the transporting unit can travel the curved part smoothly without occurring noise caused by center deviation, which is unlikely in the conventional techniques. In addition to this, in the curved traveling path of the conventional type cross belt sorter, traveling units are supported by the traveling wheels 64, 64 at the both ends of a front part of transverse member 63 (FIG. 16). As a result, there occurs deviation in the focus point, which requires many working faces. According to this, the rail and frame are made of sheet metal so that the accuracy is hardly obtained and noise results. In other words, in a conventional conveyor, the wheel position of an endless belt for a transporting unit has not been located in the center of the lower part of the unit. As a result, the wheel position deviates from the focus point of semicircle, which prevents smooth traveling and causes noise. As described above, the present invention provides a sorting conveyor in which a large number of connected transporting units travel on a transporting route shaped in the loop configuration, and the respective transporting units include an endless belt capable of being driven in a direction perpendicular to the traveling direction, in which a belt conveyor or a drive roller conveyor can be driven in the direction perpendicular to the traveling direction of the respective transporting units, said belt conveyor or drive roller conveyor is driven in the cross direction at the sorting position while electricity is supplied by the generator, which enables the smooth sorting work.

As described in claim 5, there is provided an oblique side rail on the traveling guide rail that is supported by the coaster type wheel, and there are provided two traveling wheels at both ends of the chassis so that the transporting unit travels smoothly along a circular excursion with the focus point as its center at the time when the transporting unit travels on curved part. With this structure, noise can be eliminated. Moreover, as described in claim 6, the link is assembled so as to include a spacer at the connecting part detachably in advance, which makes it possible to adjust the elongation of the link chain easily in such a manner as to attach/detach the spacer to/from the connecting part.

What is claimed is:

1. A sorting conveyor for traveling a plurality of transporting units connected to each other along a transporting route of a loop shape provided on a plane surface so as to displace a carrying item at a sorting position on the transporting units, comprising:
   a center rail and both-side guide rails provided along the transporting route;
   transporting units guided by the center rail and the both-side guide rails, said transporting units comprising a chassis formed with a beam shaped link for subsequently connecting the transporting units and a base fixed to a center of an upper part of the link in a direction perpendicular to a traveling direction of the transporting units; a conveyor for cross sorting mounted on the upper part of the chassis in such a manner that the cross-sorting conveyor can be driven reversely in the direction perpendicular to the traveling direction of the transporting units; a bilateral pair of coaster shaped traveling wheels mounted on both sides of the base so as to come into contact with the both-side guide rails; and a center guide wheel suspended from a connecting portion of the link so as to come into contact with the center rail; and
   a drive unit provided at a predetermined location of the transporting route for traveling the transporting units by a belt having a friction roller moving in such a manner to contact with both side surfaces of the beam shaped link under pressure, wherein said traveling wheels travel along a circular locus whose center is a focus point of the curved transporting route while traveling on a curved part of the transporting route.

2. The sorting conveyor according to claim 1, wherein said conveyor for cross sorting is an endless belt conveyer.

3. The sorting conveyor according to claim 1, wherein said conveyor for cross sorting is a drive roller conveyor.

4. The sorting conveyor according to claim 1, wherein a connecting unit for linking the transporting unit is attached to the front end and rear end of said beam shaped link, and a guide wheel is suspended from respective connecting units of said link end so as to travel while coming into contact with a center rail of the center of the transporting route.

5. The sorting conveyor according to claim 1, wherein the coaster shaped traveling wheels are composed of traveling wheels provided adjacent to both sides of the base of the transporting unit in such a manner as to come into contact with level guide rails mounted on both sides of the transporting route and oblique guide wheels contacting with an oblique guide rail in such a manner as to pinch the oblique guide rail by associating with the traveling wheels against oblique side rails provided at the lower portion of both level guide rails.

6. The sorting conveyor of claim 1, wherein the cross sorting conveyor is driven by power generated by using traveling energy of the transporting unit in such a manner that a supporting shaft of the coaster shaped traveling wheels is commonly used as the shaft of a generator fixed to the base.

7. The sorting conveyor according to claim 1, wherein a connecting unit having the same width as the link is assembled so as to insert a spacer at an end part of the link detachably, wherein said connecting unit supports a shaft part of the guide wheel guided by said center rail with a spherical sliding bearing.

* * * * *